(12) United States Patent
Kamata (10) Patent No.: US 11,265,697 B2
(45) Date of Patent: Mar. 1, 2022

(54) RADIO COMMUNICATION EQUIPMENT AND CONTROL METHOD THEREOF

(71) Applicant: KYOCERA Corporation, Kyoto (JP)

(72) Inventor: Tokiyasu Kamata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 11 days.

(21) Appl. No.: 16/615,098

(22) PCT Filed: May 23, 2018

(86) PCT No.: PCT/JP2018/019889
§ 371 (c)(1),
(2) Date: Nov. 19, 2019

(87) PCT Pub. No.: WO2018/216745
PCT Pub. Date: Nov. 29, 2018

(65) Prior Publication Data
US 2020/0252786 A1    Aug. 6, 2020

(30) Foreign Application Priority Data

May 24, 2017 (JP) .............................. JP2017-102344

(51) Int. Cl.
*H04W 8/18* (2009.01)
*H04W 76/50* (2018.01)
(Continued)

(52) U.S. Cl.
CPC ............. *H04W 8/183* (2013.01); *H04W 4/14* (2013.01); *H04W 8/20* (2013.01); *H04W 76/50* (2018.02); *H04W 92/08* (2013.01)

(58) Field of Classification Search
CPC ....... H04W 8/183; H04W 76/50; H04W 4/14; H04W 8/20; H04W 92/08;
(Continued)

(56) References Cited

U.S. PATENT DOCUMENTS

| | | |
|---|---|---|
| 9,594,472 B2 | 3/2017 | Carls et al. |
| 2006/0183500 A1 | 8/2006 | Choi |

(Continued)

FOREIGN PATENT DOCUMENTS

| | | |
|---|---|---|
| CN | 105391706 A | 3/2016 |
| DE | 19959903 A1 | 6/2001 |

(Continued)

OTHER PUBLICATIONS

Meng Kui; "Design and Realization of Service Ordering Module of Telecom Integrated Information Platform"; Engineering Master Dissertation; Dec. 31, 2012; University of Electronic Science and Technology of China with English language abstract.

*Primary Examiner* — Joseph E Dean, Jr.
(74) *Attorney, Agent, or Firm* — Studebaker & Brackett PC (57) ABSTRACT

A radio communication equipment comprises an information card configured to record information on a service subscription provided by a network operator, a radio communicator configured to receive notification information of cancellation for the subscription by short message service (SMS) via radio communication, and a controller configured to notify that a subscription to a network operator corresponding to the information card has been cancelled, in response to the notification information received by the SMS.

8 Claims, 8 Drawing Sheets

(51) Int. Cl.
*H04W 4/14* (2009.01)
*H04W 8/20* (2009.01)
*H04W 92/08* (2009.01)

(58) Field of Classification Search
CPC ......... H04M 1/72463; H04M 1/72484; H04M 1/72436; H04M 11/04; H04M 1/00
See application file for complete search history.

(56) References Cited

U.S. PATENT DOCUMENTS

| | | | | |
|---|---|---|---|---|
| 2009/0014519 | A1* | 1/2009 | Singh | G06K 7/0008 235/437 |
| 2012/0135762 | A1* | 5/2012 | Cheng | H04W 36/0055 455/500 |
| 2014/0080422 | A1* | 3/2014 | Guo | H04W 24/02 455/67.11 |
| 2016/0285493 | A1 | 9/2016 | Veneroso | |
| 2018/0338230 | A1 | 11/2018 | Neuhaeuser | |

FOREIGN PATENT DOCUMENTS

| | | |
|---|---|---|
| DE | 69827385 T2 | 11/2005 |
| DE | 60313589 T2 | 1/2008 |
| DE | 102011112447 A1 | 3/2013 |
| DE | 102016201162 A1 | 7/2017 |
| EP | 0789500 A2 | 8/1997 |
| EP | 1337120 A2 | 8/2003 |
| JP | 2009-207008 A | 9/2009 |
| JP | 2012-138710 A | 7/2012 |
| JP | 2013-085053 A | 5/2013 |
| JP | 2014-036340 A | 2/2014 |
| WO | 0176309 A1 | 10/2001 |
| WO | 2012/086794 A1 | 6/2012 |

* cited by examiner

RADIO COMMUNICATION EQUIPMENT AND CONTROL METHOD THEREOF

TECHNICAL FIELD

The present invention relates to a radio communication equipment using an information card such as a SIM card and a control method thereof.

BACKGROUND ART

In some radio communication equipments conforming to the 3rd generation partnership project (3GPP), a subscriber identity module card (SIM card) or a user identity module (UIM) card (hereinafter, referred to simply as SIM card) provided by a network operator (also referred to as an operator or a telecommunication carrier) are used by being attached to a radio communication equipment.

The SIM card is an IC card in which subscriber (user) information of a radio communication equipment and a subscribed service are stored. The user can use a subscribed service by using the radio communication equipment on which the SIM card is attached.

In recent years, in order to provide a service in telematics that provides traffic information, navigation information, and the like, a communication module mounted on a vehicle such as an automobile is also used with a SIM card (see, for example, Patent Literature 1).

CITATION LIST

Patent Literature

Patent Literature 1: Japanese application publication No. 2014-036340

SUMMARY OF INVENTION

Technical Problem

The present invention provides a radio communication equipment capable of appropriately determining a subscription status of a SIM card used for the radio communication equipment, and a control method thereof.

Solution to Problem

A radio communication equipment for this application comprises an information card configured to record information on a service subscription provided by a network operator, a radio communicator configured to receive notification information of cancellation for the subscription by short message service (SMS) via radio communication, and a controller configured to notify that a subscription to a network operator corresponding to the information card has been cancelled, in response to the notification information received by the SMS.

Advantageous Effects of Invention

The present invention provides a radio communication equipment capable of appropriately determining a subscription status of a SIM card used for the radio communication equipment, and a control method thereof.

DESCRIPTION OF EMBODIMENTS

In the following, an embodiment will be described with reference to the drawings.

Figure 1:
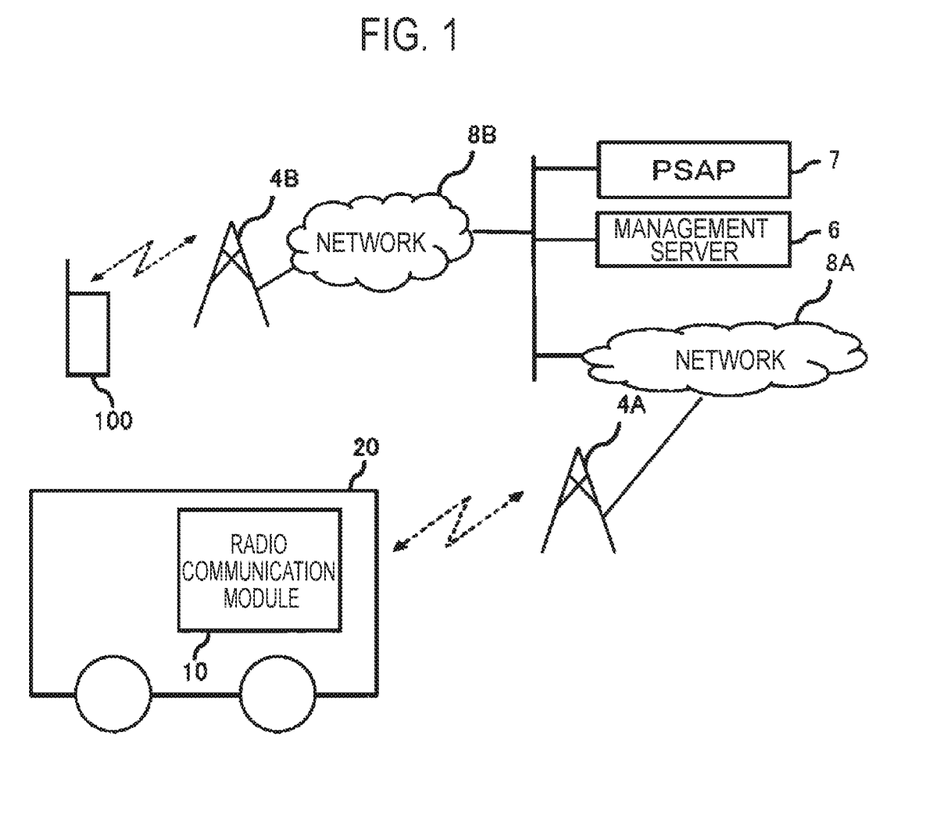
FIG. 1 is a configuration diagram of a radio communication system according to the present embodiment.

FIG. 1 is a block diagram of a radio communication system according to an embodiment. The radio communication system illustrated in FIG. 1 has a vehicle 20 installed with a radio communication module 10, a base station 4A and a base station 4B, a network 8A and a network 8B, a radio terminal 100, a management server 6, and a PSAP 7. The PSAP is an abbreviation for Public Safety Answering Point.

The base station 4A, the base station 4B, the network 8A, and the network 8B are provided by a network operator A. Hereinafter, when the base station 4 or the network 8 is not distinguished for description, the base station 4 or the network 8 is simply described, whereas when the base station 4 or the network 8 is distinguished for description, the base stations 4A and 4B, or the networks 8A and 8B are described.

The base station 4 may cope with any mobile telecommunications systems, including second-generation mobile telecommunications systems, such as global system for mobile communications (GSM) (registered trademark), third-generation mobile telecommunications systems, such as code division multiple access (CDMA), or fourth-generation mobile telecommunications systems, such as long term evolution (LTE).

A radio communication module 10 implements various functions. For example, in implementing an emergency call system, the radio communication module 10 is configured to call PSAP7 (including an emergency call center) in the case of emergency. Also, after a call with a PSAP7 operator, the PSAP7 may receive an incoming call from the radio communication module 10. The radio communication module 10 may make it possible to make a call or receive the incoming call by an IP telephone based on voice over internet protocol (VoIP) or the like.

Furthermore, there are known telematics services that provide information services real time in combination of the vehicle 20 with a communication system. In the telematics services, map data and point of interest (POI) data for data updates of a navigation system from a server on the network 8. In the telematics services, diagnostic information on the equipment installed on the vehicle is uploaded to the server on the network 8. The radio communication module 10 performs such downloads and uploads via the network 8.

In the present embodiment, the radio communication module 10 is illustrated as an in vehicle system (IVS) mounted on a moving body such as a vehicle 20. In the present embodiment, the vehicle 20 is described as the moving body. As a matter of course, the moving body may be any moving object such as a ship, a train, or a mobile terminal such as a mobile phone or a smartphone.

The radio communication module 10 may cope with second-generation mobile telecommunications systems, third-generation mobile telecommunications systems, or fourth-generation mobile telecommunications systems. The radio communication module 10 may communicate with the radio terminal 100. The radio communication module 10 may have various functions and functions that execute programs created by a user.

The network operator A that manages the base station 4 or the network 8 provides network operator's mobile communications services to users that have concluded a contract with the network operator.

Figure 2:
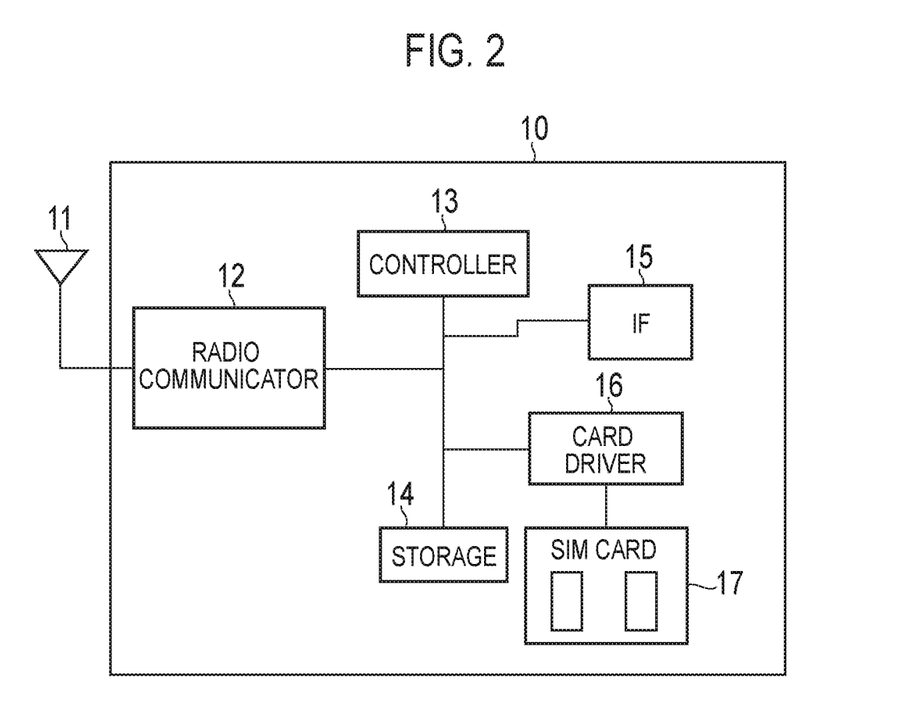
FIG. 2 is a block diagram of a radio communication module according to the present embodiment.

FIG. 2 is a block diagram of the radio communication module according to the embodiment. The radio communication module illustrated in FIG. 2 has an antenna 11, a radio communicator 12, a controller 13, a storage 14, an IF 15, a card driver 16, and a subscriber identity module (SIM) card 17.

The antenna 11 transmits and receives radio signals with the base station 4.

The radio communicator 12 communicates with the base station 4 by radio communication through the antenna 11. The radio communicator 12 has an analog signal processor and a digital signal processor.

The analog signal processor performs amplification, an analog-to-digital conversion process, and any other process of radio signals received from the antenna 11, performs analog amplification, including a digital-to-analog conversion process, of the digital signals transferred from the digital signal processor, and transmits the analog signals through the antenna 11.

The digital signal processor encodes data transferred from the controller 13, and converts the data into digital signals such that the data can be transmitted through the communication channel of radio signals, whereas the digital signal processor decodes the digital signals transferred from the analog signal processor, and transfers the decoded data to the controller 13.

The controller 13 is mainly configured of a microcomputer formed of a central processing unit (CPU) that executes various programs, a read only memory (ROM), a random access memory (RAM), a backup RAM, an input/output (I/O), and any other component (none of them are illustrated in the drawings), and executes various control programs stored on the ROM to execute various processes. The controller 13 executes processes necessary to control the radio communicator 12.

The storage 14 is configured of an electronically erasable and programmable read only memory (EEPROM) that can electrically rewrite the content, for example, and the storage 14 stores programs and information necessary to control the radio communicator 12.

The IF 15 is a universal serial bus IF and any other IF, and is connected to a display, a microphone, and a speaker, or a navigation system, for example.

The card driver 16 drives an IC card referred to as a SIM card (or a UIM card), i.e., an information card. The card driver 16 may accept and reject the SIM card 17. In the case in which the card driver 16 is instructed to read or write configuration information by the controller 13, the card driver 16 reads configuration information recorded on the SIM card 17, and writes configuration information on the SIM card 17.

Generally, the SIM card is an IC card recording information that identifies a subscriber, network operator identification information that identifies a network operator, and information on services usable by the subscriber in contract, and any other information.

The SIM card 17 may be an embedded eSIM (Embedded SIM). The SIM card 17 may be disposed on the outside of the radio communication module 10. The SIM card 17 may be supplied by the network operator, or may be obtained through other means. The user mounts or connects the supplied SIM card 17 to the radio communication module 10 to use the radio communication module 10.

The SIM card records configuration information necessary to receive services. For example, there are various pieces of configuration information, such as information in the registration of location information and information on a telephone number (e.g. an IVS telephone number). These pieces of information may be managed in the management server 6 on the network 8.

Further, a SIM card 17 may be a dual SIM. The dual SIM has two SIM card slots, and one radio communication module or terminal can use any SIM card compatible network arbitrarily. Alternatively, dual SIM may refer to an external adapter configured to allow the use of two SIM cards.

Hereinafter, an operation of the radio communication system according to the present embodiment will be described.

The radio communication system according to the present embodiment is configured to be able to use Short Message Service (SMS). A text of the SMS is usually communicated via Public Land Mobile Network (PLMN), but may be communicated via communication via a wireless LAN or the like.

The radio communication module 10 is configured to receive a text including notification information in a body of the SMS. The notification information relates to cancellation, subscription, and the like. The radio communication module 10 performs a response based on the notification information. Also, the radio communication module 10 may determine the response depending on a sender.

Figure 3:
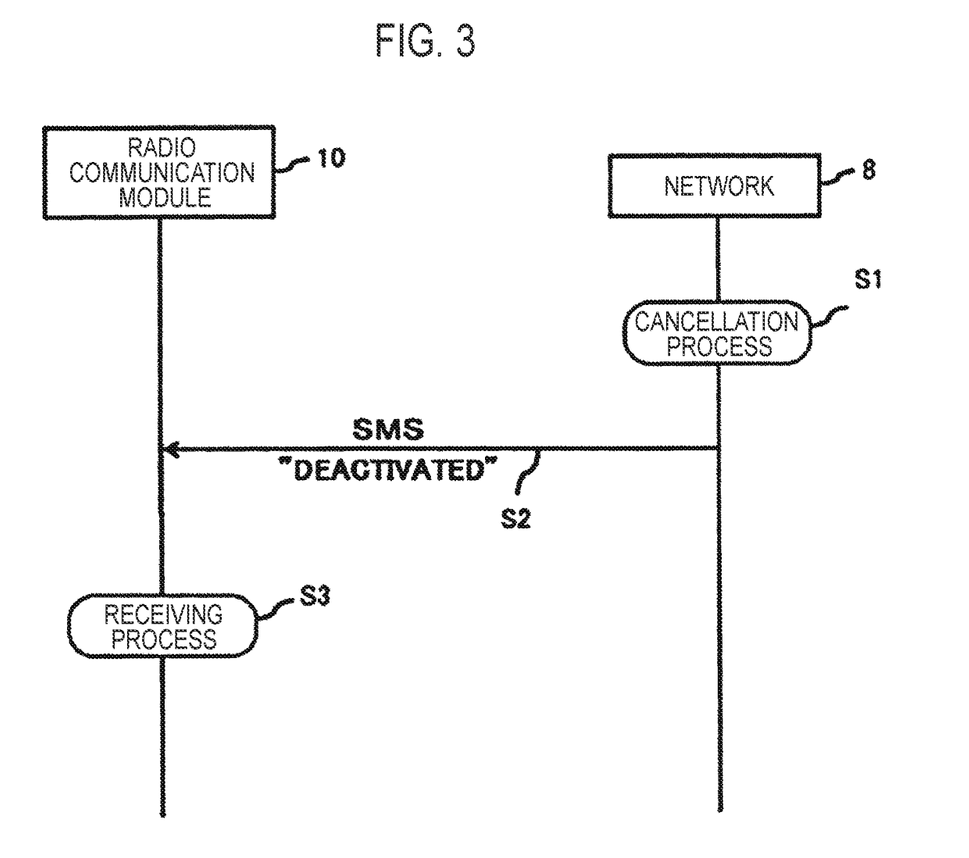
FIG. 3 is a sequence diagram illustrating a cancellation operation of the radio communication system according to the present embodiment.

FIG. 3 is a sequence diagram illustrating the cancellation operation of the radio communication system according to the present embodiment. The radio communication module 10 is assumed to be in a state of being subscribed to a network operator, and to be in location registration.

First, a cancellation process for bringing the SIM card 17 of the radio communication module 10 into a cancelled state is performed by an operator such as a network operator or a car dealer (step S1). At that time, a short message via SMS is transmitted from a server such as a management server 6 via the network 8 to the radio communication module 10 (step S2).

In the body of the short message transmitted in step S2, a character string "DEACTIVATED" is described, which indicates the cancellation of the subscription to the network operator. This character string "DEACTIVATED" is an example only, and the character string indicating the cancellation of the subscription may be any character string indicating the cancellation of the subscription negotiated between the network operator and the radio communication module 10.

The radio communication module 10 receives the short message transmitted in step S2 (step S3). A controller 13 analyzes the short message and detects the character string "DEACTIVATED" indicating the cancellation of the subscription, thereby recognizing that the subscription to the network operator corresponding to the SIM card 17 has been cancelled. Note that recognizing that the subscription has been cancelled includes storing in a storage 14.

If the subscription is cancelled, the service that has been subscribed cannot be used. Also, sign-up information when it has been subscribed cannot be used. The sign-up information when it has been subscribed is, for example, a telephone number (for example, MSISDN: mobile station international subscriber directory number).

When the subscription is cancelled, the controller 13 may notify the user that the cancellation has been made using a display or a speaker via IF15.

In addition, the controller 13 may determine whether or not the sender of the short message is that of the network operator which is currently subscribed. For example, if the sender's telephone number or identification information is recorded in advance in the SIM card, the controller 13 can determine whether or not the sender of the short message is that of the network operator to which the subscription is currently made. If this sender belongs to the network operator to which the sender is currently subscribed, the controller 13 determines that the subscription to the currently subscribed network operator has been cancelled. If the sender is not the one of the network operator which is currently subscribed, the controller 13 may present a short message to the user via the IF15 using the display or the speaker.

The radio communication module 10 may use dual SIM. At this time, there may be a case in which a user is under subscription to a network operator corresponding to two SIM cards. In step S3, when the radio communication module 10 receives a short message, the controller 13 may refer to each of the information of the two SIM cards to confirm whether or not the sender of this short message is one of the network operators which are currently subscribed.

Some radio communication systems may determine that cancellation is performed with a specific value among the reject causes received when the radio terminal performs location registration and fails. However, 3GPP does not define a reject cause to indicate cancellation, for example, the specific reject cause used for cancellation can be any of the following reject causes, because the value to be adopted is not fixed depending on the network operator.

Reject Cause (Reject Cause) #2: IMSI unknown in HLR/IMSI unknown in HSS

Reject Cause (Reject Cause) #7: GPRS services not allowed/EPS services not allowed Reject Cause (Reject Cause) #8: GPRS services and non-GPRS services not allowed Therefore, depending on the situation, there is a risk that the radio terminal may determine that the cancellation was made erroneously. However, in the present embodiment, it is not determined that the cancellation was made erroneously.

Figure 4:
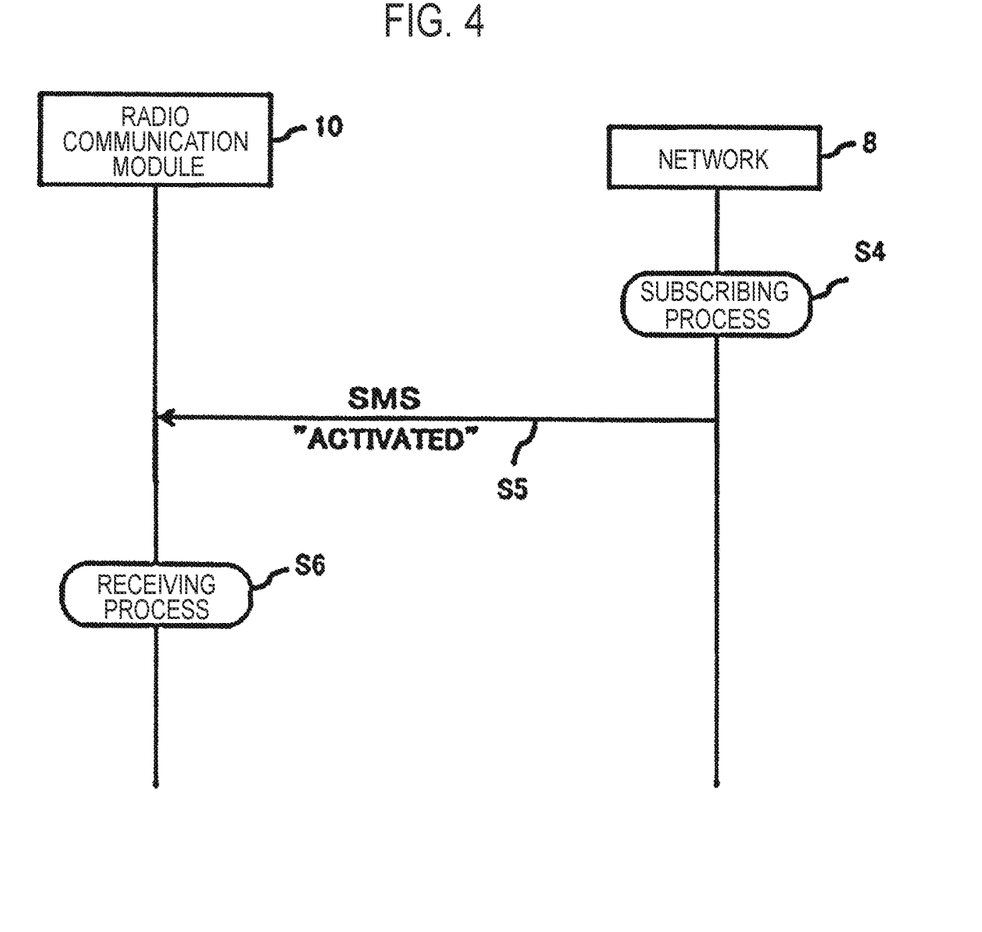
FIG. 4 is a sequence diagram illustrating a re-subscribing operation of the radio communication system according to the present embodiment.

FIG. 4 is a sequence diagram illustrating a re-subscribing operation of the radio communication system according to the present embodiment. The radio communication module 10 is in a state of being cancelled by the network operator. Here, the subscription is described as a re-subscription but it may be a subscription.

First, a re-subscribing process for bringing the SIM card 17 of the radio communication module 10 into a re-subscribed state is performed by an operator such as a network operator or a car dealer (step S4). At that time, a short message by SMS is transmitted from the server such as the management server 6 via the network 8 to the radio communication module 10 (step S5).

In the body of the short message transmitted in step S5, a character string "ACTIVATED" is described, which represents cancellation of the subscription to the network operator. The character string "ACTIVATED" is an example only, and the character string indicating the cancellation of the subscription may be any character string indicating the cancellation of the subscription negotiated between the network operator and the radio communication module 10.

The radio communication module 10 receives the short message transmitted in step S5 (step S6). The controller 13 analyzes the short message and detects the character string "ACTIVATED" indicating the execution of the subscription, thereby confirming that the re-subscription to the network operator corresponding to the SIM card 17 has been made.

Although FIG. 3 illustrates an example in which "DEACTIVATED" is described in the body of the SMS short message. However, in the radio communication system according to the present embodiment, SMS with over-the-air (OTA) function, which allows writing, rewriting, or deleting of information with respect to the SIM card, may be used as described below.

Figure 5:
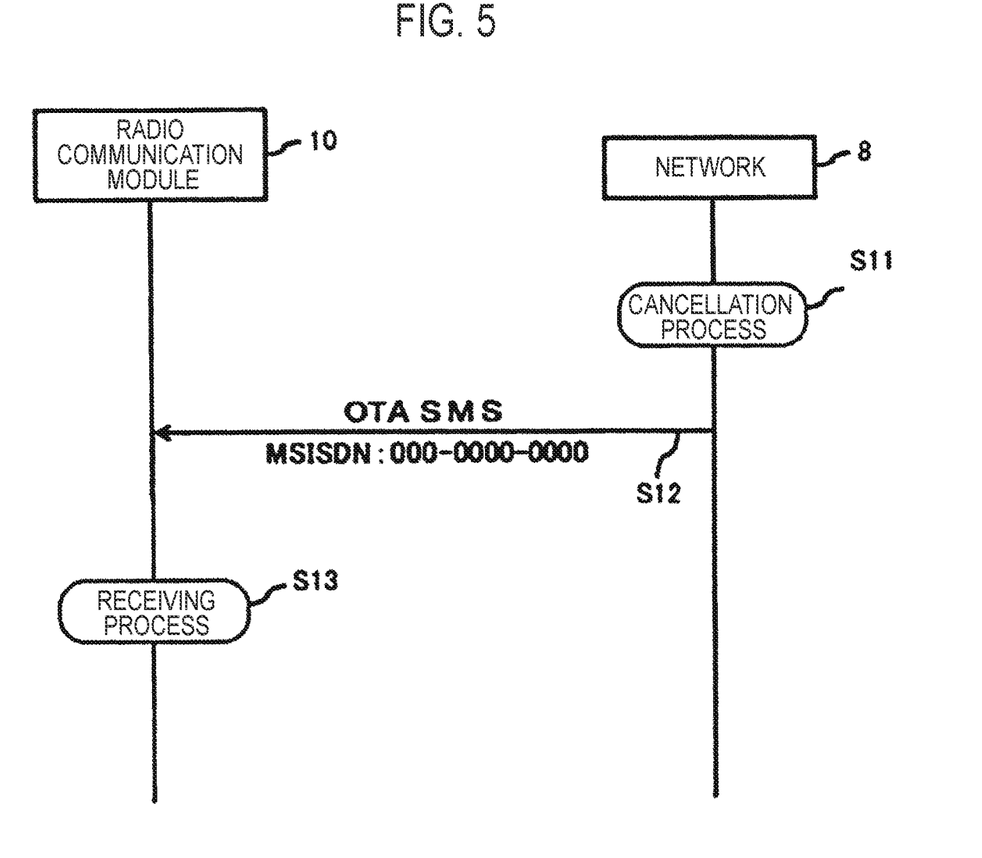
FIG. 5 is a sequence diagram illustrating a cancellation operation of the radio communication system according to the present embodiment using OTA.

FIG. 5 is a sequence diagram illustrating the cancellation operation of the radio communication system according to the present embodiment using OTA. The radio communication module 10 is assumed to be in a state of being subscribed to a network operator, and to be in location registration.

First, cancellation process for bringing the SIM card 17 of the radio communication module 10 into a cancelled state is performed by an operator such as a network operator or a car dealer (step S11). At that time, the OTA by SMS is transmitted to the radio communication module 10 (step S12).

The OTA short message transmitted in step S12 includes an instruction to rewrite the telephone number (MSISDN) to the specific number "000-0000-0000". In this embodiment, the telephone number "000-0000-0000" represents the cancellation of the subscription to the network operator.

The radio communication module 10 receives the short message transmitted in step S12 (step S13). The controller 13 analyzes the short message and detects an instruction to rewrite the telephone number (MSISDN) to "000-0000-0000", and thus recognizes that the subscription to the network operator corresponding to the SIM card 17 is cancelled. The controller 13 then rewrites the telephone number (MSISDN) of the SIM card 17 to "000-0000-0000".

Figure 6:
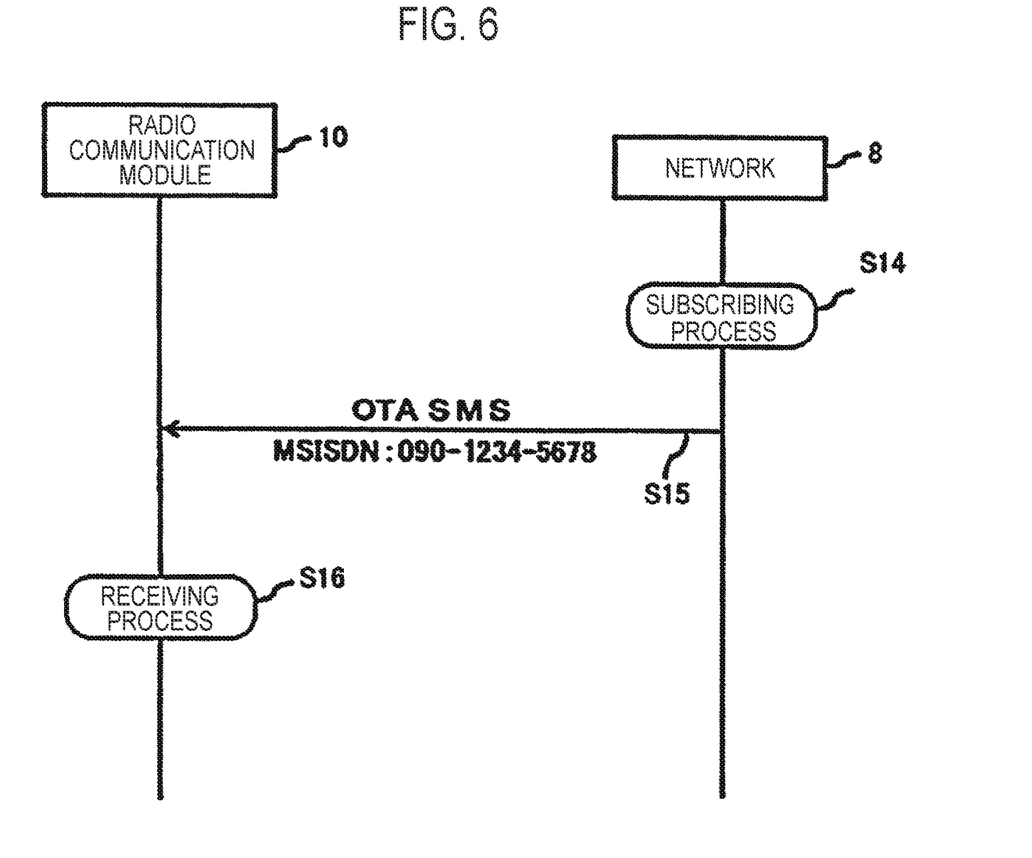
FIG. 6 is a sequence diagram illustrating a re-subscribing operation of the radio communication system according to the present embodiment using OTA.

FIG. 6 is a sequence diagram illustrating the re-subscribing operation of the radio communication system according to the present embodiment using OTA. The radio communication module 10 is in a state of being cancelled by the network operator. Here, the subscription is described as a re-subscription but it may be a subscription.

First, a re-subscribing process for bringing the SIM card 17 of the radio communication module 10 into a subscribed state is performed by an operator such as a network operator or a car dealer (step S14). At that time, the OTA by SMS is transmitted to the radio communication module 10 (step S15).

The OTA short message transmitted in step S15 includes, for example, an instruction to rewrite the telephone number (MSISDN) to "090-1234-5678". In this embodiment, since the telephone number "090-1234-5678" is not a specific number (for example, "000-0000-0000"), it indicates a re-subscription to a network operator.

The radio communication module 10 receives the short message transmitted in step S15 (step S16). The controller 13 analyzes the short message and detects an instruction to rewrite the telephone number (MSISDN) to "090-1234-5678", and thus confirms that the re-subscription to the network operator corresponding to the SIM card 17 has been made. The controller 13 then rewrites the telephone number (MSISDN) of the SIM card 17 to "090-1234-5678".

Up to this point, although the operation of cancelling the subscription to the network operator and performing the subscription has been described, it is also assumed that the subscription to the communication carrier may be temporarily cancelled due to various circumstances such as the absence of the annual fee.

Figure 7:
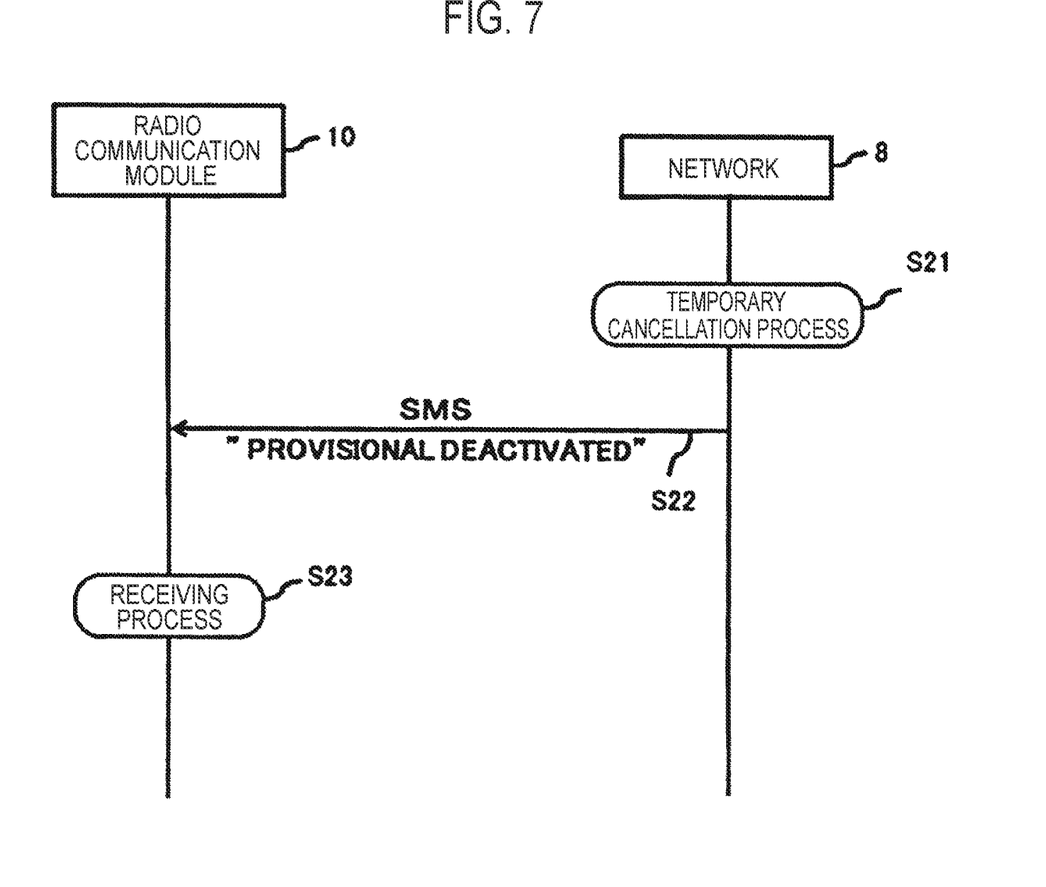
FIG. 7 is a sequence diagram illustrating a cancellation operation of the radio communication system according to the present embodiment when temporarily cancelling a subscription to a network operator.

FIG. 7 is a sequence diagram illustrating a cancellation operation of the radio communication system according to the present embodiment when temporarily cancelling a subscription to a network operator. The radio communication module 10 is assumed to be in a state of being subscribed to a network operator, and to be in location registration.

First, temporary cancellation process for temporarily bringing the SIM card 17 of the radio communication module 10 into a cancelled state is performed by an operator such as a network operator or a car dealer (step S21). At that time, a short message by SMS is transmitted from the server such as the management server 6 via the network 8 to the radio communication module 10 (step S22).

In the body of the short message transmitted in step S22, a character string "PROVISIONAL DEACTIVATED" is described, which indicates the temporal cancellation of the subscription to the network operator. This character string "PROVISIONAL DEACTIVATED" is an example only, and the character string indicating the temporary cancellation of the subscription may be any character string indicating the temporary cancellation of the subscription negotiated between the network operator and the radio communication module 10.

The radio communication module 10 receives the short message transmitted in step S22 (step S23). A controller 13 analyzes the short message and detects the character string "PROVISIONAL DEACTIVATED" indicating the temporary cancellation of the subscription, thereby recognizing that the subscription to the network operator corresponding to the SIM card 17 has been temporarily cancelled.

If the subscription is temporarily cancelled, the service is limited to only some services. For example, the services include an emergency call service that can automatically make a call to PSAP7 (including an emergency call center) in the case of emergency such as a vehicle accident, a call service that can make a call with any other party, and a telematics service.

For example, if the subscription is temporarily cancelled in the case where the radio communication module 10 subscribes to the emergency call service, the call service, and the telematics service, the available service is only the emergency call service. Even in a case where subscribing to a call service and another service that is not a telematics service, if the subscription is temporarily cancelled, the available service may be only the emergency call service.

If the subscription is temporarily cancelled in a case where the radio communication module 10 subscribes to the emergency call service and the call service, the available services are limited only to the emergency call service and the ability to call only a specific party.

When the subscription is temporarily cancelled, the controller 13 may notify the user that the subscription is temporarily cancelled using the display or the speaker via the IF15.

In addition, the controller 13 may confirm whether or not the sender of the short message is that of the network operator which is currently subscribed. For example, the sender's telephone number or identification information may be recorded in advance in the SIM card to allow the controller 13 to confirm whether or not the sender of the short message is that of the network operator to which the subscription is currently made. If this sender is that of a network operator, the controller 13 recognizes that the subscription to the network operator corresponding to the SIM card 17 has been temporarily cancelled. If this sender is not of a network operator, the controller 13 may present a short message to the user via the IF15 using the display or the speaker.

In the case where the radio communication module 10 uses dual SIM, there may be a case where a network operator and a user corresponding to two SIM cards are under subscription. In step S23, when the radio communication module 10 receives a short message, the controller 13 may refer to each of the information of the two SIM cards to confirm whether or not the sender of this short message is one of the network operators which are currently subscribed.

Next, an operation of subscribing again for the radio communication module 10 that has temporarily cancelled the subscription to the network operator will be described.

Figure 8:
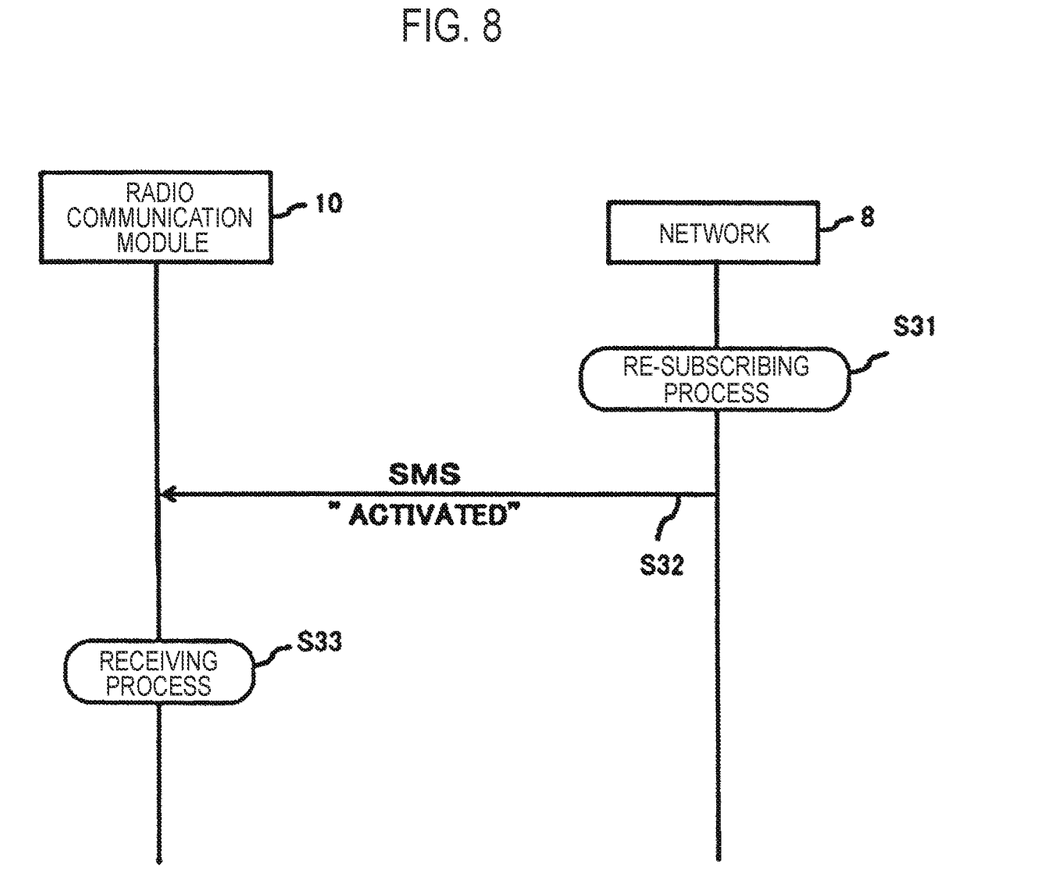
FIG. 8 is a sequence diagram illustrating a subscribing operation of the radio communication system according to the present embodiment at the time of subscription.

FIG. 8 is a sequence diagram illustrating a subscribing operation performed by the radio communication system according to the present embodiment at the time of subscription. The radio communication module 10 is in a state of temporarily canceling the subscription to the network operator.

First, a subscribing process for bringing the SIM card 17 of the radio communication module 10 into a subscribed state is performed by an operator such as a network operator or a car dealer (step S31). At that time, a short message by SMS is transmitted from the server such as the management server 6 via the network 8 to the radio communication module 10 (step S32).

In the body of the short message transmitted in step S32, a character string "ACTIVATED" is described, which represents the subscription to the network operator. The character string "ACTIVATED" is an example only, and the character string indicating the subscription may be any character string indicating the subscription negotiated between the network operator and the radio communication module 10.

The radio communication module 10 receives the short message transmitted in step S32 (step S33). The controller 13 analyzes the short message and detects the character string "ACTIVATED" indicating the subscription, thereby confirming that the subscription to the network operator corresponding to the SIM card 17 has been made.

If the subscription is made again, the service from the previous subscription will become available. For example, if the radio communication module 10 has previously subscribed for emergency call service, call service, and telematics service, these services will become available when the re-subscription is made.

In the case where the radio communication module 10 has previously subscribed for the emergency call service and the call service, if the radio communication module 10 is subscribed again, the telematics service may be available in addition to these services. That is, in a case where the re-subscription is made, available services may increase or decrease.

When the subscription is made, the controller 13 may notify the user that the subscription has been made using a display or a speaker via IF15.

In addition, the controller 13 may confirm whether or not the sender of the short message is that of the network operator which is currently subscribed. For example, the sender's telephone number or identification information may be recorded in advance in the SIM card to allow the controller 13 to confirm whether or not the sender of the short message is that of the network operator to which the subscription is currently made. If this sender is that of a network operator, the controller 13 confirms that the subscription to the network operator corresponding to the SIM card 17 has been made. If this sender is not of a network operator, the controller 13 may present a short message to the user via the IF15 using the display or the speaker.

In the case where the radio communication module 10 uses dual SIM, there may be a case where a network operator and a user corresponding to two SIM cards are under subscription. In step S33, when the radio communication module 10 receives a short message, the controller 13 may refer to each of the information of the two SIM cards to confirm whether or not the sender of this short message is one of the network operators which are currently subscribed.

As described above, the radio communication module according to the present embodiment does not determine that the cancellation is made by a specific value out of reject causes that is received at the time of location registration or the like, but receives notification information on SIM card cancellation, subscription and the like. Therefore, the subscription status of the SIM card can be determined appropriately. Further, since the radio communication module according to the present embodiment does not judge that cancellation is performed at a specific value among the reject causes received at the time of location registration or the like, it does not judge that cancellation has been made erroneously.

The communication between the radio communication module 10 and the network 8 is not particularly limited, and WiFi or the like may also be used.

This application is based on Japanese Patent Application (Japanese Patent Application No. 2017-102344) filed on May 24, 2017, the contents of which are incorporated herein by reference.

INDUSTRIAL APPLICABILITY

The present invention can provide a radio communication equipment capable of appropriately determining the subscription status of the SIM card used for the radio communication equipment, and a control method thereof.

REFERENCE SIGNS LIST

4 Base station
8 Network
6 Management server
7 PSAP
10 Radio communication module
11 Antenna
12 Radio communicator
13 Controller
14 Storage
15 IF
16 Card driver
17 SIM card
20 Vehicle
100 Radio terminal

The invention claimed is:

1. A radio communication equipment comprising:
a processor; and
a memory coupled to the processor, the processor being configured to:
drive an information card on which information on a service subscription provided by a network operator is recorded;
receive notification information of cancellation for the subscription by short message service (SMS) via radio communication; and
notify a user of the radio communication equipment that a subscription to a network operator corresponding to the information card has been cancelled, using a display or a speaker, in response to the notification information received by the SMS.

2. The radio communication equipment according to claim 1, wherein
the processor is further configured to:
confirm whether or not the sender of the notification information is a currently subscribed network operator, and
notify the user that the subscription has been cancelled, using the display or the speaker, when the sender is the currently subscribed network operator.

3. The radio communication equipment according to claim 2, wherein
the processor is configured to:
refer to each of the information of two information cards when a dual SIM is used as the information card, and
confirm whether or not the sender of the notification information is one of the network operators which are currently subscribed.

4. A radio communication equipment comprising:
a processor; and
a memory coupled to the processor, the processor being configured to:
drive an information card on which information on a service subscription provided by a network operator is recorded;
receive notification information of temporary cancellation for the subscription by a short message service (SMS) via radio communication; and
notify a user of the radio communication equipment that a subscription to the network operator corresponding to the information card has been temporarily cancelled, using a display or a speaker, in response to the notification information received by the SMS.

5. The radio communication equipment according to claim 4, wherein
the service is restricted only to some services, when the subscription is temporarily released.

6. The radio communication equipment according to claim 4, wherein
the service is restricted only to an emergency call service when the subscription is temporarily released.

7. The radio communication equipment according to claim 4, wherein
the processor is configured to notify the user that subscription is made to the network operator corresponding to the information card, using the display or the speaker, when receiving a notification information for a subscription when a subscription to a network operator corresponding to the information card is temporarily cancelled.

8. A method of controlling a radio communication equipment, the method comprising:
- driving an information card on which information on a service subscription provided by a network operator;
- receiving notification information of temporary cancellation for the subscription by a short message service (SMS) via radio communication; and
- notifying a user of the radio communication equipment that a subscription to the network operator corresponding to the information card has been temporarily cancelled, using a display or a speaker, in response to the notification information received by the SMS.

* * * * *